United States Patent
Perkins et al.

(10) Patent No.: US 8,958,965 B2
(45) Date of Patent: Feb. 17, 2015

(54) SYSTEM AND METHOD FOR MANAGING A POWERTRAIN IN A VEHICLE

(75) Inventors: William Paul Perkins, Dearborn, MI (US); Scott Howard Gaboury, Ann Arbor, MI (US); Steven A. Daleiden, Milan, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 2236 days.

(21) Appl. No.: 11/854,692

(22) Filed: Sep. 13, 2007

(65) Prior Publication Data
US 2009/0076696 A1    Mar. 19, 2009

(51) Int. Cl.
| | |
|---|---|
| *G06F 7/00* | (2006.01) |
| *G06F 17/00* | (2006.01) |
| *G06F 19/00* | (2011.01) |
| *B60K 23/08* | (2006.01) |
| *B60K 6/52* | (2007.10) |
| *B60K 17/35* | (2006.01) |
| *B60W 10/02* | (2006.01) |
| *B60W 10/08* | (2006.01) |
| *B60W 10/16* | (2012.01) |
| *B60W 20/00* | (2006.01) |

(52) U.S. Cl.
CPC . *B60K 23/08* (2013.01); *B60K 6/52* (2013.01); *B60K 17/3515* (2013.01); *B60W 10/02* (2013.01); *B60W 10/08* (2013.01); *B60W 10/16* (2013.01); *B60W 20/00* (2013.01); *Y02T 10/6265* (2013.01)
USPC ........ 701/69; 701/1; 701/51; 701/67; 701/81; 701/82

(58) Field of Classification Search
CPC combination set(s) only.
See application file for complete search history.

(56) References Cited

U.S. PATENT DOCUMENTS

| | | | |
|---|---|---|---|
| 5,119,900 A | 6/1992 | Watanabe et al. | |
| 5,189,930 A | 3/1993 | Kameda | |
| 5,195,037 A * | 3/1993 | Tezuka | 701/81 |
| 5,265,020 A * | 11/1993 | Nakayama | 701/36 |

(Continued)

FOREIGN PATENT DOCUMENTS

| | | |
|---|---|---|
| GB | 2221272 A | 1/1990 |
| GB | 2299143 A | 9/1996 |

(Continued)

OTHER PUBLICATIONS

Search Report, dated Dec. 22, 2008, 1 page.

*Primary Examiner* — Bhavesh V Amin
(74) *Attorney, Agent, or Firm* — David B. Kelley; Brooks Kushman P.C.

(57) ABSTRACT

A vehicle includes a first disconnect disposed between a prime mover of the vehicle and a certain one of the vehicle drive wheels. The first disconnect is operable to connect and disconnect the prime mover to and from the certain one of the drive wheels. A second disconnect is disposed between the powertrain and the certain one of the drive wheels, and is operable to connect and disconnect the certain one of the drive wheels to and from the powertrain when the first disconnect is engaged. A control system and method are configured to control operation of at least the first and second disconnects. Through selective control of the disconnects, the system can be automatically placed in a four-wheel-drive mode based on predetermined criteria, or the desirability of the four-wheel-drive mode can be indicated to the vehicle operator in a passive version of the control system and method.

19 Claims, 4 Drawing Sheets

(56) References Cited

U.S. PATENT DOCUMENTS

| | | | |
|---|---|---|---|
| 5,631,829 A * | 5/1997 | Takasaki et al. | 701/69 |
| 5,803,197 A * | 9/1998 | Hara et al. | 180/248 |
| 5,839,084 A * | 11/1998 | Takasaki et al. | 701/67 |
| 6,062,330 A * | 5/2000 | Watson et al. | 180/248 |
| 6,070,685 A * | 6/2000 | Takasaki et al. | 180/250 |
| 6,283,887 B1 | 9/2001 | Brown et al. | |
| 6,347,271 B1 | 2/2002 | Showalter | |
| 6,354,977 B1 | 3/2002 | Brown et al. | |
| 6,398,688 B2 | 6/2002 | Brown et al. | |
| 6,458,056 B1 | 10/2002 | Brown et al. | |
| 6,550,559 B1 | 4/2003 | Amatangelo et al. | |
| 6,554,731 B2 | 4/2003 | Brown et al. | |
| 6,579,204 B2 | 6/2003 | Brown et al. | |
| 6,679,565 B2 * | 1/2004 | Riddiford | 303/15 |
| 6,697,725 B1 | 2/2004 | Williams | |
| 6,793,034 B2 | 9/2004 | Raftari et al. | |
| 6,886,652 B2 | 5/2005 | Maekawa et al. | |
| 6,945,909 B2 | 9/2005 | Maekawa | |
| 6,953,411 B2 | 10/2005 | Burns et al. | |
| 2003/0162631 A1 | 8/2003 | Williams | |
| 2005/0101438 A1 | 5/2005 | Cring | |
| 2006/0065070 A1 | 3/2006 | Puiu | |
| 2006/0199697 A1 | 9/2006 | Kirkwood et al. | |
| 2007/0193808 A1 | 8/2007 | Perakes et al. | |

FOREIGN PATENT DOCUMENTS

| | | |
|---|---|---|
| GB | 2407804 A | 5/2006 |
| JP | 09-175213 | 7/1997 |

* cited by examiner

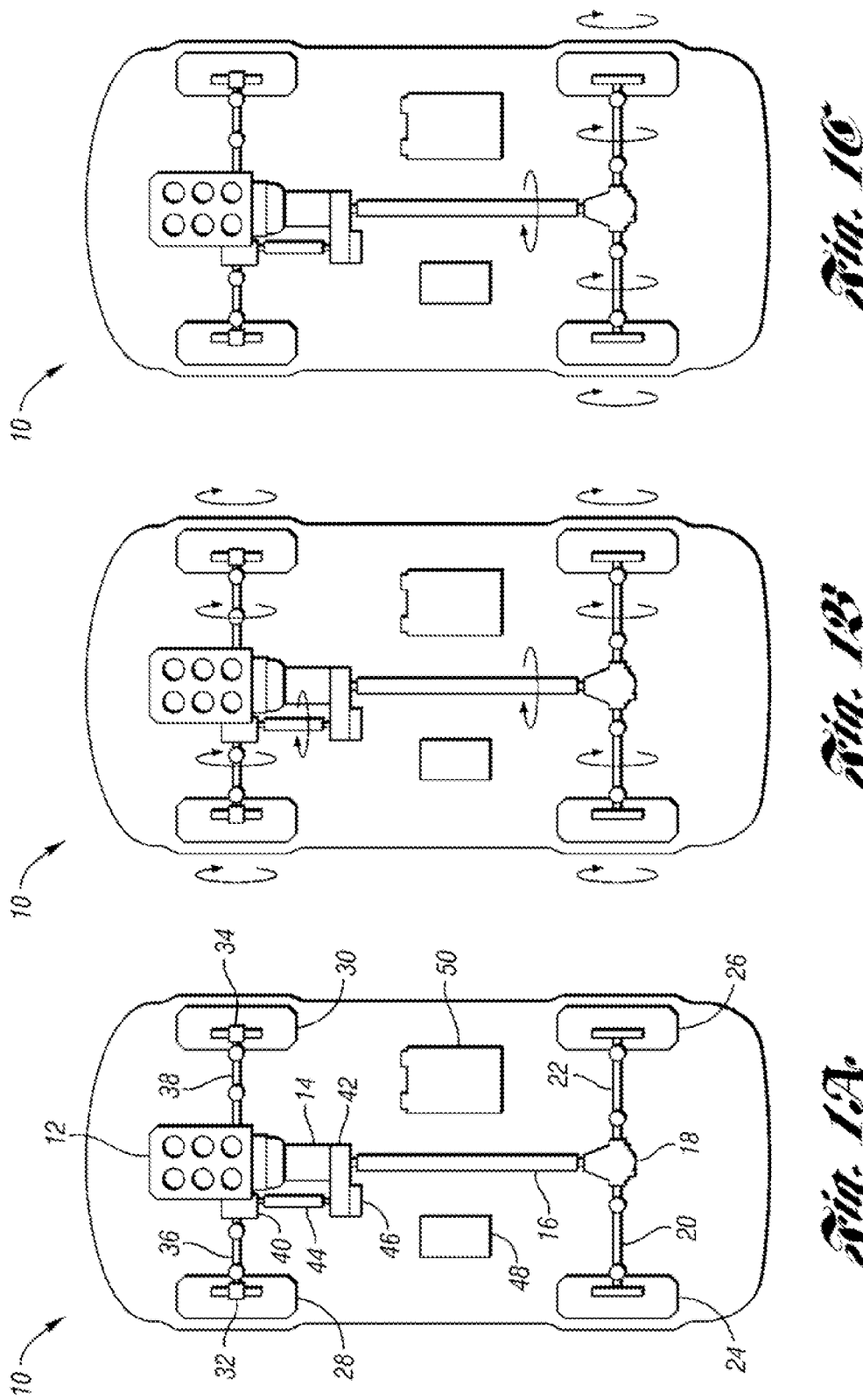

SYSTEM AND METHOD FOR MANAGING A POWERTRAIN IN A VEHICLE

BACKGROUND OF THE INVENTION

1. Field of the Invention

The present invention relates to a system and method for managing a powertrain in a vehicle.

2. Background Art

Four-wheel-drive vehicles—conventional or hybrid electric vehicles (HEV's)—utilize various driveline components to deliver propulsion torque to the wheels of the vehicle. For example, when a part-time four-wheel-drive system is operated in the four-wheel-drive mode, torque is delivered continuously to both a primary axle and a secondary axle. While each axle contains a differential, the part-time system has no center differential—i.e., there is no differential between the two axles. This means that if one of the axle's wheels are on a zero-traction surface torque is still deliverable to the other axle's wheels.

The absence of a center differential improves capability off-road, but precludes on-road usage because the lack of a center differential can cause problems with stability, handling and steering, and tire scrub. Many part-time four-wheel-drive systems utilize wheel-end disconnects so that the wheels on the secondary axle can be disconnected from the driveline when the vehicle is in the two-wheel-drive mode. Disconnecting the wheels, in conjunction with disconnecting the secondary axle from the primary axle at the transfer case, means that the secondary axle components do not rotate. This removes the drag of the secondary axle components, and increases fuel economy.

Another type of four-wheel-drive system is a full-time system, that is typically meant for on-road and light off-road usage. A full-time four-wheel-drive system distributes torque to all four wheels continuously. Unlike its part-time counterpart, it provides a differential in the transfer case to allow differentiation between the axles, making it fit for on-road use. A full-time system is often considered less capable than a part-time system in four-wheel-drive mode, because of its center differential. Unless the center differential has a torque biasing device, it acts as an open differential that delivers no torque to any of the four wheels, when one of the wheels is on a zero-traction surface.

An on-demand four-wheel-drive system, used for on-road and light off-road purposes, seeks to combine the advantages of both part-time and full-time systems by delivering torque intermittently to the secondary axle via a friction clutch. The intermittent transfer of torque to the secondary axle, if controlled properly, behaves like a center differential during on-road use, while the application of the friction clutch simulates a part-time four-wheel-drive mode providing increased traction for off-road use. While the on-demand system can make the vehicle capable in both on-road and off-road uses, it lacks the fuel-saving benefits provided by the wheel-end disconnects. The rapid application and release of the friction clutch in the transfer case precludes the use of wheel-end disconnects, which cannot provide fast and frequent engagement and disengagement. Therefore, a need exists for a system and method that provides the advantages of an on-demand four-wheel-drive system, with the fuel economy benefits of a part-time system.

SUMMARY OF THE INVENTION

Embodiments of the present invention provide a system and method that utilize an on-demand friction clutch and wheel-end disconnects. These devices are combined with control system logic to minimize the adverse impact on fuel economy otherwise present in four-wheel-drive systems.

Embodiments of the present invention include a system and method that allow the vehicle operator's commands to control two-wheel-drive and four-wheel-drive mode, but which monitor a number of conditions to determine a desired mode of operation. When the system determines that a change in operating mode to or from four-wheel-drive is desirable, the vehicle operator is alerted through one or more indicators. Because embodiments of the invention utilizing this system and method do not override the vehicle operator's commands, but merely alert the operator, such embodiments may be referred to as a "passive" mode of operation.

In at least one embodiment of the passive mode, the system will engage the wheel-end disconnects and apply the friction clutch in the transfer case on an as-needed basis, when the driver selects on-demand four-wheel-drive. If the vehicle is already moving, the system controller will first gradually apply the friction clutch to bring the secondary driveline components up to vehicle speed, and then engage the wheel-end disconnects. The friction clutch will then be applied as needed to provide on-demand four-wheel-drive capability.

If, after a specified time period, a specified distance, or both, the system deems four-wheel-drive unnecessary, the system controller will provide a signal to the vehicle operator that four-wheel-drive should be disabled to save fuel. The signal can be provided via an instrument cluster icon, text message, or any other audio, visual, or even tactile signal effective to alert the driver. If conditions requiring four-wheel-drive are later detected, the system controller can signal the vehicle operator that the on-demand four-wheel-drive mode should be enabled. If the vehicle operator then selects the four-wheel-drive mode, the friction clutch is again gradually applied to bring the secondary driveline components up to vehicle speed, and the wheel-end disconnects are engaged. As before, the friction clutch will be applied or released as needed to provide four-wheel-drive capability depending on the vehicle operating conditions.

Embodiments of the present invention also include a system and method that function much like the passive mode of operation described above, except that intervention from the vehicle operator is not required. Because the enabling and disabling of the four-wheel-drive takes place automatically, such systems and methods may be conveniently referred to as providing an "active" mode of operation for the vehicle. Although the vehicle operator may be alerted on each change to or from the four-wheel-drive mode, no operator intervention is required. It is contemplated within the scope of the present invention that a vehicle may combine passive and active modes of operation. For example, one such implementation may use a vehicle personalization switch that allows the vehicle operator to switch between active and passive modes.

Embodiments of the invention also provide a method for managing a powertrain in a vehicle that includes a prime mover, a front drive wheel, and a rear drive wheel. The vehicle is operable in a first driving mode, in which the front and rear drive wheels are selected to drive the vehicle. The vehicle is also operable in a second driving mode, in which either but not both of the front or rear drive wheels is selected to drive the vehicle. The vehicle includes a clutch disposed between the prime mover and a certain one of the drive wheels. The certain one of the drive wheels has a changeable connection status to the powertrain such that it is selectively connectable to and disconnectable from the powertrain.

The clutch has a disabled mode wherein it is not engagable, and an enabled mode wherein it is engagable, for connecting the certain one of the drive wheels to the prime mover when the certain one of the drive wheels is connected to the powertrain. The method includes determining whether the vehicle is operating in the first driving mode, and when it is operating in the first driving mode, determining whether the vehicle has changed from the second driving mode to the first driving mode within a first predetermined time period. The certain one of the drive wheels is connected to the powertrain, and the clutch is enabled when it is determined that the vehicle has changed from the second driving mode to the first driving mode within the first predetermined time period.

Embodiments of the present invention also include a method for managing a powertrain substantially as described above, wherein the vehicle includes a first pair of drive wheels proximate one end of the vehicle, and a second pair of drive wheels proximate the other end of the vehicle. In these embodiments, the first driving mode is a four-wheel-drive mode, and the second driving mode is a two-wheel-drive mode. Some embodiments may include an electric motor arrangement operable to provide torque to one pair of the drive wheels that is connectable to and disconnectable from the powertrain. In such embodiments, the motor arrangement can be operated prior to connecting the clutch when it is determined that the vehicle is moving. This allows the motor to bring driveline components up to a generally synchronous speed with the drive wheels prior to the clutch being engaged.

Embodiments of the invention also include a system for managing a powertrain in a vehicle that includes a prime mover, a front drive wheel and a rear drive wheel. The vehicle is operable in a first driving mode, in which the front and rear drive wheels are selected to drive the vehicle. It is also operable in a second driving mode, in which either but not both of the front or rear drive wheels is selected to drive the vehicle. The system includes a first disconnect disposed between the prime mover and a certain one of the drive wheels. The first disconnect is operable to connect the prime mover to, and disconnect the prime mover from, the certain one of the drive wheels. A second disconnect is disposed between the powertrain and the certain one of the drive wheels. The second disconnect is operable to connect the certain one of the drive wheels to, and disconnect the certain one of the drive wheels from, the powertrain. A control system including at least one controller is configured to control operation of at least the first and second disconnects.

BRIEF DESCRIPTION OF THE DRAWINGS

FIG. 1A is a schematic illustration of a vehicle including a system in accordance with embodiments of the present invention;

FIG. 1B is a schematic illustration of the vehicle shown in FIG. 1A operating in a four-wheel-drive mode;

FIG. 1C is a schematic illustration of the vehicle shown in FIG. 1A operating in a two-wheel-drive mode;

DETAILED DESCRIPTION OF EMBODIMENTS OF THE INVENTION

Figure 2C:
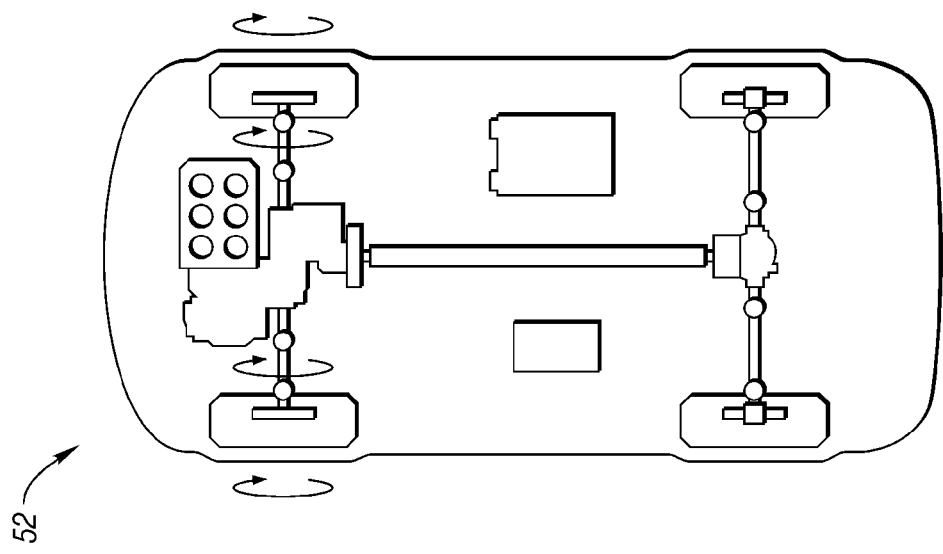
FIG. 2C is a schematic illustration of the vehicle shown in FIG. 1A operating in a two-wheel-drive mode.
Figure 2B:
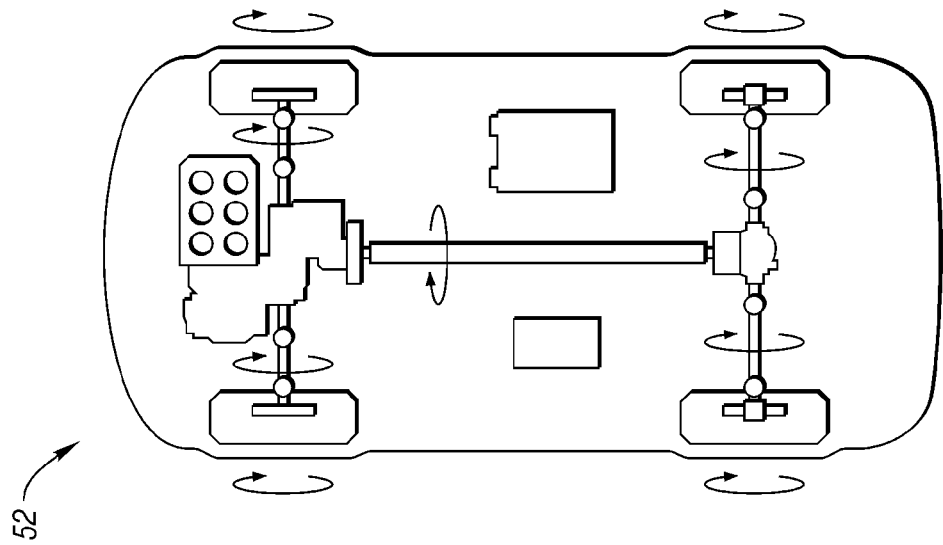
FIG. 2B is a schematic illustration of the vehicle shown in FIG. 2A operating in a four-wheel-drive mode.

FIG. 1A shows a vehicle 10 that includes an engine 12, a transmission 14, and a rear drive shaft 16. The drive shaft 16 is connected to a rear differential 18, which has connected to it rear half-shafts 20, 22. The rear half-shafts 20, 22 are respectively connected to rear wheels 24, 26. As shown in FIG. 1A, the vehicle architecture is configured such that torque from the engine 12 is output through the transmission 14 to the drive shaft 16, and ultimately to the rear drive wheels 24, 26. In this configuration, the engine 12 is a "prime mover", supplying the primary torque to drive the vehicle 10. The engine 12, transmission 14, drive shaft 16, differential 18, and rear half-shafts 20, 22 make up at least part of the vehicle powertrain.

The vehicle 10 also includes front drive wheels 28, 30, which are selectively connectable to and disconnectable from the powertrain by wheel-end disconnects 32, 34. When the disconnects 32, 34 are engaged, the wheels 28, 30 will rotate with front half-shafts 36, 38. In the embodiment shown in FIG. 1A, the vehicle 10 is an HEV, and includes an electric motor arrangement 40 disposed at the front of the vehicle 10. The motor arrangement 40 can operate as a motor to output torque, and it can operate as a generator to receive torque. The motor arrangement 40 can be connected to other elements of the powertrain through a transfer case 42, also part of the powertrain, which can be configured in any of a number of different ways, well known in the art. Connecting the transfer case 42 to the motor arrangement 40, is a front drive shaft 44. The vehicle 10 also includes a friction clutch 46, which may be conveniently referred to as a "second disconnect", with the set of the wheel-end disconnects 32, 34 being conveniently referred to as a set of "first disconnects".

The vehicle 10 also includes a control system 48 that may include any number of controllers and electronics to control vehicle systems, including the wheel-end disconnects 32, 34, and the clutch 46. For clarity, communication lines between the control system 48 and the various vehicle components have been eliminated in the drawing figures. The vehicle 10 also includes a high voltage battery 50, for operating vehicle systems, including the motor arrangement 40. As discussed in detail with regard to FIGS. 3 and 4, the present invention contemplates a number of embodiments of a method that can be carried out by control logic residing in the control system 48, in conjunction with the wheel-end disconnects 32, 34 and the clutch 46, together making up a system in accordance with the present invention.

FIG. 1B illustrates the vehicle 10 operating in the four-wheel-drive mode. For clarity, the numerical labels of each of the features have been removed. Illustrated in FIG. 1B, however, are arrows illustrating rotation of the various components while the vehicle 10 is operating in the four-wheel-drive mode. For example, and with reference to FIG. 1A, the engine 12 operates to provide torque to the rear wheels 24, 26 through the drive shaft 16 and the rear half-shafts 20, 22. The clutch 46 is engaged, such that torque is transferred through the transfer case 42, the front drive shaft 44, and the front half-shafts 36, 38, to the front drive wheels 28, 30. The front drive shaft 44, the motor arrangement 40, and the front half-shafts 36, 38 may be conveniently referred to as a "secondary driveline"; whereas, the rear drive shaft 16, rear differential 18, and rear half-shafts 20, 22 may be conveniently referred to as a "primary driveline". With the clutch 46 engaged, the secondary driveline receives torque from the engine 12, and is effectively made a part of the vehicle powertrain. Disengaging the clutch 46 disconnects the secondary driveline from the powertrain, and causes the vehicle 10 to be operated in a two-wheel-drive mode. This is illustrated in FIG. 1C.

As shown in FIG. 1C, when the vehicle 10 is operating in a two-wheel-drive mode, only the rear drive shaft 16, the rear half-shafts 20, 22, and the rear wheels 24, 26 receive torque from the engine 12. With the clutch 46 disengaged, as shown in FIG. 1C, none of the secondary driveline components receive torque from the engine 12. Moreover, because the wheel-end disconnects 32, 34 are disengaged, torque from the wheels 28, 30 is not fed back into the secondary driveline components. The use of the wheel-end disconnects 32, 34 in the present invention provides advantages over on-demand systems that only provide a disconnect at the transfer case. Without the wheel-end disconnects 32, 34, torque from the wheels 28, 30 would be fed back into the secondary driveline components, causing the front half-shafts 36, 38, the motor arrangement 40, and the front drive shaft 44 to rotate whenever the vehicle 10 was moving. This increases drag, and decreases fuel efficiency; this undesirable situation is eliminated by the present invention, which combines the clutch 46 with wheel-end disconnects 32, 34.

Through controlled use of the clutch 46, the motor arrangement 40, and the wheel-end disconnects 32, 34, transitions between a two-wheel-drive mode and four-wheel-drive mode can occur quickly and smoothly, such that these transitions are virtually transparent to the vehicle operator. For example, if the vehicle 10 is moving, and it is in the two-wheel-drive mode, as illustrated in FIG. 1C, the primary driveline components will be rotating rapidly, while the secondary driveline components are not rotating at all. At the same time, the front wheels 28, 30 will be rotating at approximately the same speed as the rear wheels 24, 26. In this situation, engagement of the wheel-end disconnects 32, 34 to connect the wheels 28, 30 to the secondary driveline will probably be undesirable. This is because wheel-end disconnects, such as the disconnects 32, 34, will often be relatively simple devices, such as dog clutches. Without a more elaborate torque transfer mechanism, such as found in the friction clutch 46, connecting rotating components having a great difference in speed is not desirable.

One way that the present invention overcomes this problem is to operate the motor arrangement 40 to rotate the front half-shafts 36, 38 at an approximately synchronous speed with the wheels 28, 30 prior to engagement of the wheel-end disconnects 32, 34. In this way, even dog clutches may be smoothly engaged with little torque disturbance. At this point, the clutch 46 can be quickly engaged, since the front drive shaft 44 will also be rotating, since it will now be receiving torque from the front wheels 28, 30.

It is worth noting that embodiments of the present invention also include systems and methods applicable to conventional—i.e., non-hybrid—vehicles. For example, if the motor arrangement 40 is eliminated, and the front drive shaft 44 connects to the front half-shafts 36, 38 via a front differential, changing from two-wheel-drive mode to four-wheel-drive mode while the vehicle is moving can still be smoothly achieved through controlled operation of the friction clutch 46. For example, when the secondary driveline is connected to the powertrain, components in the transfer case 42 and the front drive shaft 44 may not rotate at the same speed as the front half-shafts 36, 38 and the front wheels 28, 30. In such a case, the friction clutch 46 can be applied in a controlled way such that the front half-shafts 36, 38 are brought to substantially synchronous speed with the front wheels 28, 30 prior to the wheel-end disconnects 32, 34 being engaged. Thus, the combination of the friction clutch 46 and the wheel-end disconnects 32, 34 as contemplated by the present invention provides flexibility with regard to switching between two-wheel-drive mode and four-wheel-drive mode.

Figure 2A:
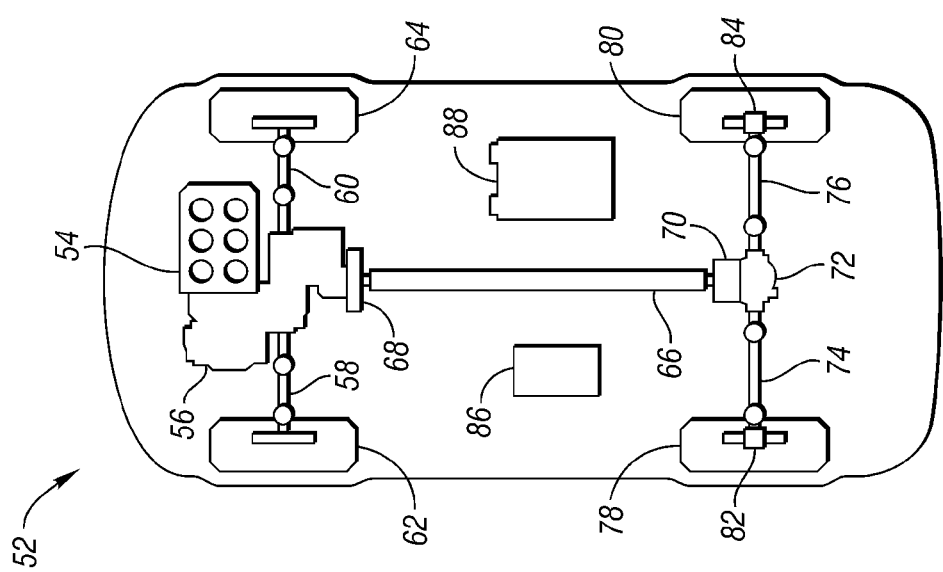
FIG. 2A is a schematic illustration of a vehicle including a system in accordance with embodiments of the present invention.

FIG. 2A illustrates a vehicle 52 having an engine 54, which acts as a prime mover for the vehicle 52, outputting torque through a transmission 56 to front half-shafts 58, 60 to drive front wheels 62, 64. It is worth noting that although the vehicles 10 and 52 described herein utilize an internal combustion engine as a prime mover, other vehicle architectures may have different prime movers, such as electric motor arrangements, or combinations of engine and motor arrangements that can individually or together act as a prime mover. For example, one architecture may use as a prime mover a combination of an engine and a motor arrangement, where the motor arrangement cannot contribute torque to drive the vehicle, but rather, is configured to act as a motor to start the engine and as a generator to charge a battery, receiving torque from the engine or vehicle wheels.

Returning to FIG. 2A, it is shown that a rear drive shaft 66 can receive torque from the engine 54 when a friction clutch 68 is engaged. The vehicle 52 also includes an electric motor arrangement 70 that cooperates with a rear differential 72 to transfer torque to and from rear half-shafts 74, 76, and ultimately to and from rear wheels 78, 80. As with the vehicle 10, shown in FIG. 1A, the vehicle 52 includes a control system and electronics 86, and a high voltage battery 88.

The vehicle 52 also includes wheel-end disconnects 82, 84, but as shown in FIG. 2A, they are disposed on the rear wheels 78, 80. The friction clutch 68 is operable in a controlled manner, like the friction clutch 46 described in conjunction with the vehicle 10 illustrated in FIG. 1A. Thus, the friction clutch 68 can be slowly applied while the vehicle 52 is moving in order to bring the secondary driveline components—now the rear driveline components—up to speed prior to engaging the wheel-end disconnects 82, 84. Although the electric motor arrangement 70 can also be operated to perform the same function, it may be desirable to use the friction clutch 68 in some cases.

In addition to this function, the friction clutch 68 can also be used to bias the torque from the engine 54 between the front and rear drivelines. For example, if the friction clutch 68 is completely engaged, there will be an approximately 50-50 split in torque between the front and rear drivelines. If, however, the friction clutch 68 is only partially engaged, more of the torque will remain in the front driveline, with the rear driveline receiving less than half of the engine output. This will result in a first torque being transferred between the engine 54 and the drive wheels 62, 64, and a second torque less than the first torque being transferred between the engine 54 and the drive wheels 78, 80. This can be beneficial, for example, when the rear wheels 78, 80 are on a low friction surface.

Biasing the torque toward one of the drivelines may also be beneficial when torque is being transferred from the wheels to the powertrain, for example, in the case of capturing regenerative braking energy. In some vehicles, an electric motor arrangement may be present in the primary driveline at the front of the vehicle. In such a case, it may be desirable to operate a friction clutch, such as the clutch 68, to bias the torque transferred to the motor arrangement such that more torque is transferred to the motor arrangement from the front wheels than from the back wheels.

One example is in the case of an aggressive braking event. During such an event, the vehicle weight will shift toward the front of the vehicle, and more regenerative braking energy can be captured here. Therefore, operating a friction clutch to bias the torque as described above more efficiently captures the available regenerative braking energy. Although different types of mechanisms may be employed to connect the primary and secondary drivelines, friction clutches such as illustrated in FIGS. 1A and 2A provide a relatively uncomplicated and effective mechanism for performing these functions.

Similar to FIGS. 1B and 1C, FIGS. 2B and 2C illustrate the vehicle 52 operating in the four-wheel-drive mode and the two-wheel-drive mode. The primary difference is that the vehicle 52, when operating in the two-wheel-drive mode, is a front-wheel-drive vehicle. Thus, the front driveline is the primary driveline in the vehicle 52, and the secondary driveline is the rear driveline.

Figure 3:
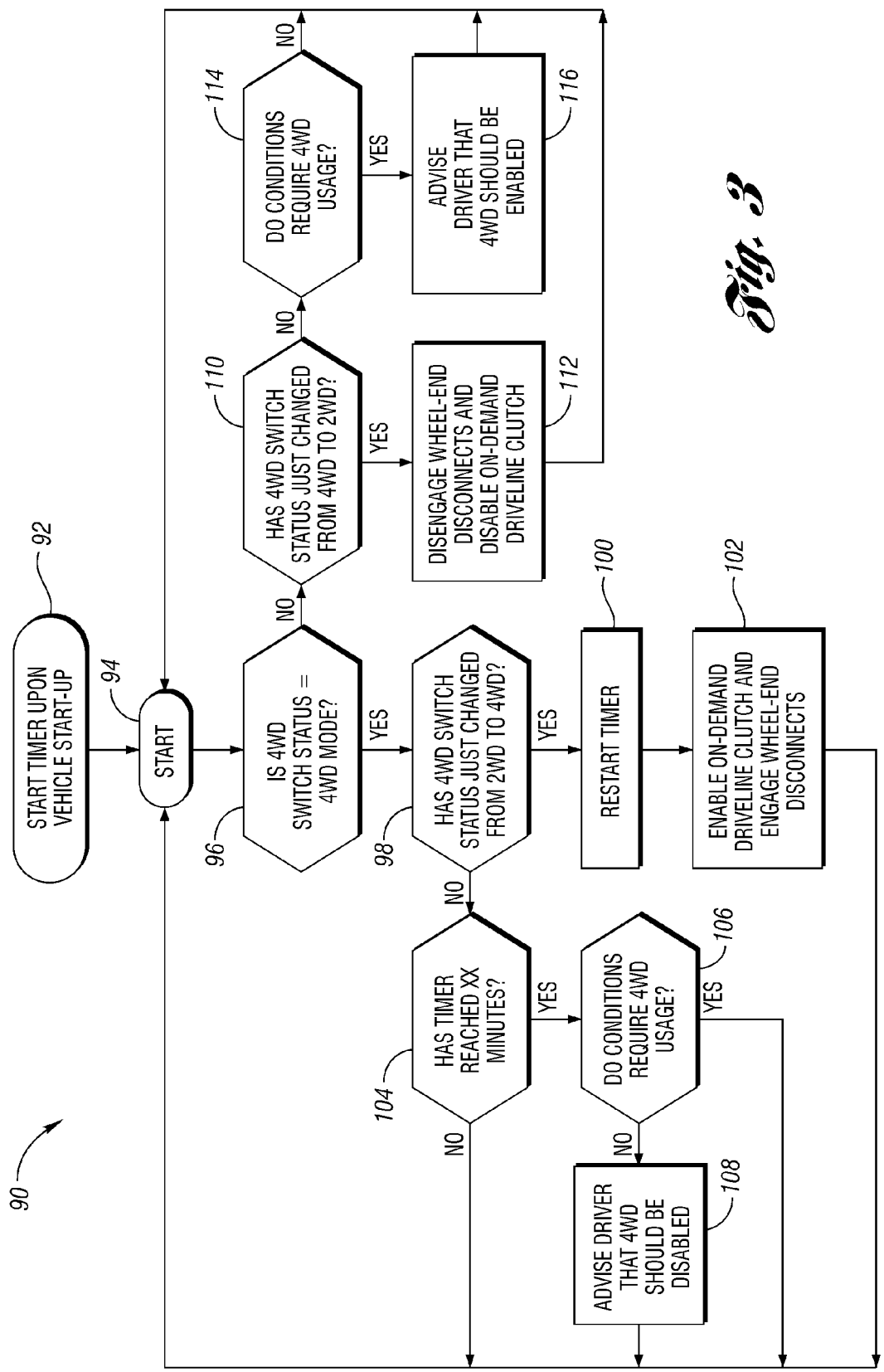
FIG. 3 is a flow chart illustrating a method in accordance with an embodiment of the present invention.
Figure 4:
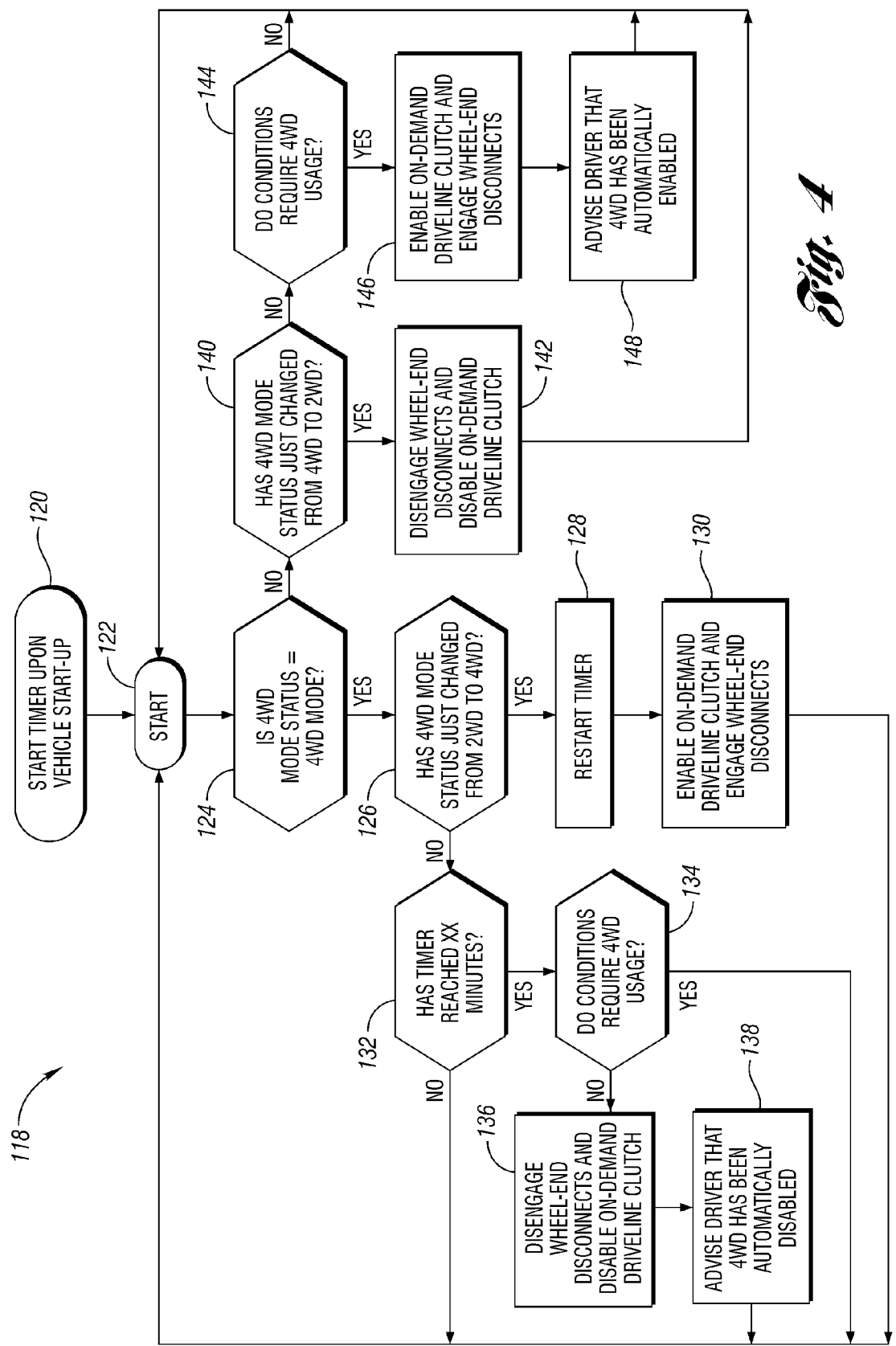
FIG. 4 is a flow chart illustrating a method in accordance with another embodiment of the present invention.

FIGS. 3 and 4 illustrate embodiments of the present invention, and for their description, the system and vehicle shown in FIG. 1A will be referenced. FIG. 3 shows a flow chart 90 that starts at step 92 with the initiation of a timer when the vehicle 10 is started. This step may occur automatically in the vehicle 10, regardless of whether a method of the present invention is implemented. Therefore, the control strategy, which may for example reside in the control system 48, is shown as starting at step 94 in FIG. 3. At decision block 96, it is determined whether the vehicle 10 is in a first driving mode, or four-wheel-drive mode. If the answer is "yes", it is next determined at decision block 98 whether the vehicle has just recently been changed from the second driving mode, or two-wheel-drive mode, to the four-wheel-drive mode.

This determination is based on whether the change has occurred within a first predetermined time. In practice, the control system 48 may analyze vehicle systems at some predetermined frequency. The period of the frequency can be taken as the first predetermined time period, which may be on the order of milliseconds or seconds, though other periods may be used. If the vehicle has been placed into four-wheel-drive mode since the last time the control system 48 checked the vehicle systems, the answer to decision block 98 will be "yes". In such a case, the timer is reset at step 100, and at step 102 the driveline clutch 46 is enabled and the wheel-end disconnects 32, 34 are engaged.

If, at decision block 98, it is determined that the vehicle was also in the four-wheel-drive mode the last time the control system 48 checked the status—i.e., the vehicle 10 has been in the four-wheel-drive mode for more than the first predetermined time period—the method moves to decision block 104. At decision block 104, it is determined whether the timer, which was reset at vehicle startup, and at step 100 if step 100 has been reached, has reached a second predetermined time period. Step 100 may generically be referred to as an "indicating step", with a "first indicator" being the timer reset.

It is worth noting that although decision block 104 uses a time as a first criterion, distance may also be used as a criterion. In such a case, the first indicator may be a distance indicator, such that a mileage counter is reset. Then, step 104 might ask the question as to whether a certain predetermined distance has been traveled since the last time the mileage counter has been reset. Other embodiments may use a combination of a temporal indicator and a distance indicator to provide the decision step in 104. The use of a time or distance criterion prior to disabling four-wheel-drive helps to ensure that the driving modes will not be switched back and forth too frequently, which can cause undesirable wear on system components. Thus, the second predetermined time period may be, in some embodiments, on the order of between five and fifteen minutes, though other time periods may be used.

If at decision block 104 it is determined that the timer has not reached the second predetermined time period, the vehicle 10 is kept in the four-wheel-drive mode, and the method loops back to step 94. Conversely, if it is determined at decision block 104 that the second predetermined time period has elapsed, another decision block is encountered at step 106. In particular, a number of conditions are examined by the vehicle control system 48 to determine whether four-wheel-drive usage is warranted. Any of a number of different criteria can be used, with different priorities being assigned as desired. For example, the traction available at the primary and secondary drive wheels, as influenced by road conditions, and the vehicle's static and dynamic weight distribution, may be examined. A determination may be made as to whether front and rear biasing may be desired to optimize vehicle propulsion or regenerative braking.

The information related to the conditions described above may be provided to the control system 48 through, for example, wheel speed sensors, transmission speed sensors, ambient air temperature sensors, optical road surface sensors, global positioning systems (GPS), vehicle accelerometers, and restraint system sensors, just to name a few. Some of these systems and their uses are described in detail in U.S. Pat. No. 7,870,925; entitled "System And Method For Managing A Powertrain In A Vehicle", which is hereby incorporated herein by reference. If, at decision block 106, it is determined that the selected criteria are met, the vehicle 10 is kept in four-wheel-drive mode, and the method loops back to step 94.

Different embodiments of the present invention contemplate the use of different criteria in decision block 106, such that a single criteria may be determinative, and may be the only one examined, or a number of criteria may be examined, with an arbitration scheme applied to determine which criteria should control. If, at decision block 106, it is determined that the appropriate conditions do not exist, an indicator is provided to the vehicle operator at step 108 advising him or her that four-wheel-drive mode should be disabled. In the embodiment illustrated in FIG. 3, the four-wheel-drive mode is not automatically disabled, but rather, an indicator is provided to the driver. Thus, this embodiment may be conveniently referred to as a "passive" mode of control.

Returning to decision block 96, if it is determined that the vehicle is in the second driving mode, or two-wheel-drive mode, the method moves to decision block 110, where it is determined whether the vehicle has just changed status from the four-wheel-drive to the two-wheel-drive mode within some third predetermined time period. The third predetermined time period may in fact be the same as the first predetermined time period used at decision block 98—i.e., the period of the frequency of vehicle systems update that takes place in the control system 48. If it is determined at decision block 110 that this change has taken place within the third predetermined time period, the wheel-end disconnects 32, 34 are disengaged and the on-demand driveline clutch 46 is disabled at step 112. In this case, the vehicle operator will have recently selected the two-wheel-drive mode of operation and the control strategy of the present invention honors this request by changing the vehicle mode status.

If, however, at decision 110, it is determined that the vehicle 10 has been in the two-wheel-drive mode for more than the third predetermined time period, a number of vehicle conditions are examined at decision block 114 to determine whether use of four-wheel-drive mode is warranted. The criteria used at decision block 114 may be the same, substantially the same, or different from the criteria used at decision block 106. Regardless, if it is determined that the conditions do not warrant the use of four-wheel-drive, the method keeps the vehicle 10 in the two-wheel-drive mode, and loops back to step 94. If, however, it is determined that four-wheel-drive mode is warranted, the vehicle operator is advised of this at step 116; however, because this embodiment illustrates the "passive" mode of the present invention, four-wheel-drive is not automatically enabled.

FIG. 4 shows a flow chart 118 illustrating an "active" mode of operation of the present invention. In this embodiment, steps 120-134 are analogous to steps 92-106 in FIG. 3, and are therefore not described in detail. Moving to decision block 134 in the flow chart shown in FIG. 4, it is shown that a number of criteria are examined to determine if four-wheel-drive usage is warranted. If the determination is made that four-wheel-drive is warranted, the system does not change the driving mode, and the method loops back to the start at step 122. If, however, it is determined that four-wheel-drive usage is not warranted, the wheel-end disconnects 32, 34 are automatically disengaged, and the driveline clutch 46 is automatically disabled at step 136. The vehicle operator is alerted to this automatic change to the two-wheel-drive mode at step 138, although no operator intervention is required.

Steps 140-144 are analogous to steps 110-114 in the embodiment illustrated in FIG. 3. Turning therefore to step 144, a number of criteria are examined to determine if four-wheel-drive usage is warranted. As discussed above, these criteria may be the same as those used at decision block 134, or they may be different. Moreover, the predetermined time periods used in steps 126 and 140 may be the same or different from each other, and they may be the same or different from those used in the embodiment illustrated in FIG. 3. Similarly, step 128 and decision block 132 are directed toward a particular time of operation, but, as discussed above, a distance traveled or some other criterion may be used.

Returning to decision block 144, shown in FIG. 4, if the criteria examined indicate that four-wheel-drive mode of operation is not warranted, the vehicle 10 is kept in the two-wheel-drive mode and the method loops back to the start at step 122. Conversely, if the criteria examined at step 144 indicate that the four-wheel-drive mode of operation is warranted, the driveline clutch 46 is enabled, and the wheel-end disconnects 32, 34 are engaged at step 146. The automatic engagement of the wheel-end disconnects 32, 34 and the clutch 46 can be effected in any manner effective to put the vehicle 10 into the four-wheel-drive mode, such as, for example, the methods described in detail above wherein the secondary driveline components were operated to a synchronous speed with the wheels 28, 30 prior to the wheel-end disconnects 32, 34 being engaged.

After step 146, the vehicle operator is alerted at step 148 that the vehicle 10 has been automatically placed in the four-wheel-drive mode. Once in this mode, the driveline clutch 46 can be selectively engaged and disengaged as operating conditions change. As illustrated in the flow charts shown in FIGS. 3 and 4, when conditions illustrate for some period of time that four-wheel-drive mode is not required, the system will either automatically disable the clutch 46 and disengage the wheel-end disconnects 32, 34, or indicate to the vehicle operator that such transition is desirable. In this way, the present invention allows the vehicle to be operated in a four-wheel-drive mode when the extra traction and control are desirable, while facilitating operation in the two-wheel-drive mode when possible to increase fuel economy.

While the best mode for carrying out the invention has been described in detail, those familiar with the art to which this invention relates will recognize various alternative designs and embodiments for practicing the invention as defined by the following claims.

What is claimed:

1. A method for managing a powertrain in a vehicle including a prime mover, a front drive wheel and a rear drive wheel, the vehicle being operable in a first driving mode, in which the front and rear drive wheels are selected to drive the vehicle, and a second driving mode, in which either but not both of the front or rear drive wheels is selected to drive the vehicle, the vehicle further including a clutch disposed between the prime mover and a certain one of the drive wheels, the certain one of the drive wheels having a changeable connection status to the powertrain such that it is selectively connectable to and disconnectable from the powertrain, the clutch having a disabled mode wherein it is not engagable and an enabled mode wherein it is engagable for connecting the certain one of the drive wheels to the prime mover when the certain one of the drive wheels is connected to the powertrain, the method comprising:

determining whether the vehicle is operating in the first driving mode;

determining whether the vehicle has changed from the second driving mode to the first driving mode within a first predetermined time period, when it is determined that the vehicle is operating in the first driving mode; and connecting the certain one of the drive wheels to the powertrain and enabling the clutch when it is determined that the vehicle has changed from the second driving mode to the first driving mode within the first predetermined time period.

2. The method of claim 1, further comprising determining whether the vehicle is moving, and wherein the step of connecting the certain one of the drive wheels to the powertrain and enabling the clutch includes engaging the clutch prior to connecting the certain one of the drive wheels to the powertrain when it is determined that the vehicle is moving, the clutch being engaged such that a generally synchronous speed connection between the certain one of the drive wheels and the powertrain is achieved.

3. The method of claim 1, further comprising partially engaging the clutch such that a first torque is transferred between the prime mover and one of the front or rear drive wheels, and a second torque less than the first torque is transferred between the prime mover and the other of the front or rear drive wheels.

4. The method of claim 1, further comprising:

indicating with a first indicator the step of connecting the certain one of the drive wheels to the powertrain and enabling the clutch when it is determined that the vehicle has changed from the second driving mode to the first driving mode within the first predetermined time period, the first indicator including at least one of a temporal indicator or a distance indicator;

determining whether a first criterion is met when it is determined that the vehicle is in the first driving mode and has not changed from the second driving mode to the first driving mode within the first predetermined time period, the first criterion including determining at least one of whether a second predetermined time period has elapsed, or a first predetermined distance has been traveled, since the indicating step; and at least temporarily maintaining the vehicle in the first driving mode when it is determined that the first criterion is not met.

5. The method of claim 4, further comprising:

determining whether at least one predetermined operating condition is met when it is determined that the first criterion is met; and at least temporarily maintaining the vehicle in the first driving mode when it is determined that the at least one operating condition is met.

6. The method of claim 5, further comprising disconnecting the certain one of the drive wheels from the powertrain and disabling the clutch when it is determined that the at least one operating condition is not met.

7. The method of claim 5, further comprising indicating to an operator of the vehicle the desired action of selecting the second driving mode the when it is determined that the at least one operating condition is not met.

8. The method of claim 1, further comprising:
determining whether the vehicle has changed from the first driving mode to the second driving mode within a third predetermined time period, when it is determined that the vehicle is operating in the second driving mode; and
disconnecting the certain one of the drive wheels from the powertrain and disabling the clutch when it is determined that the vehicle has changed from the first driving mode to the second driving mode within the third predetermined time period.

9. The method of claim 8, further comprising:
determining whether at least one predetermined operating condition is met when it is determined that the vehicle is in the second driving mode and has not changed from the first driving mode to the second driving mode within the second predetermined time period; and
connecting the certain one of the drive wheels to the powertrain and enabling the clutch when it is determined that the at least one operating condition is met.

10. The method of claim 8, further comprising:
determining whether at least one predetermined operating condition is met when it is determined that the vehicle is in the second driving mode and has not changed from the first driving mode to the second driving mode within the second predetermined time period; and
indicating to an operator of the vehicle the desired action of selecting the first driving mode the when it is determined that the at least one operating condition is not met.

11. The method of claim 8, further comprising:
determining whether at least one predetermined operating condition is met when it is determined that the vehicle is in the second driving mode and has not changed from the first driving mode to the second driving mode within the second predetermined time period; and
at least temporarily maintaining the vehicle in the second driving mode when it is determined that the at least one operating condition is not met.

12. A method for managing a powertrain in a vehicle including a prime mover operable to provide torque to at least a first pair of drive wheels proximate one end of the vehicle, the vehicle including a second pair of drive wheels proximate another end of the vehicle, a certain one of the pairs of drive wheels having a changeable connection status to the powertrain such that each of the wheels in the certain one of the pairs of wheels is selectively connectable to and disconnectable from the powertrain, the vehicle further including a clutch disposed between the prime mover and the certain one of the pairs of drive wheels, the clutch having a disabled mode wherein it is not engagable and an enabled mode wherein it is engagable for connecting the certain one of the pairs of drive wheels to the prime mover when the certain one of the pairs of drive wheels is connected to the powertrain, the vehicle further including at least a two-wheel-drive mode and a four-wheel-drive mode, the method comprising:
determining whether the vehicle is operating in the four-wheel-drive mode;
determining whether the vehicle has changed from the two-wheel-drive mode to the four-wheel-drive mode within a first predetermined time period, when it is determined that the vehicle is operating in the four-wheel-drive mode; and
connecting each of the wheels of the certain one of the pairs of drive wheels to the powertrain and enabling the clutch when it is determined that the vehicle has changed from the two-wheel-drive mode to the four-wheel-drive mode within the first predetermined time period.

13. The method of claim 12, further comprising partially engaging the clutch such that a first torque is transferred between the prime mover and one of the pairs of drive wheels, and a second torque less than the first torque is transferred between the prime mover and the other pair of drive wheels.

14. The method of claim 12, the vehicle further including an electric motor arrangement operable to provide torque to the certain one of the pairs of drive wheels, the method further comprising:
determining whether the vehicle is moving; and
operating the motor arrangement prior to the connecting step to provide torque to the certain one of the pairs of drive wheels when it is determined that the vehicle is moving, the motor being operated such that a generally synchronous speed between the certain one of the pairs of drive wheels and the powertrain is achieved.

15. The method of claim 12, further comprising determining whether the vehicle is moving, and
wherein the step of connecting each of the wheels of the certain one of the pairs of drive wheels to the powertrain and enabling the clutch includes engaging the clutch prior to the connecting step when it is determined that the vehicle is moving, the clutch being engaged such that a generally synchronous speed connection between each of the wheels of the certain one of the pairs of drive wheels and the powertrain is achieved.

16. A system for managing a powertrain in a vehicle including a prime mover, a front drive wheel and a rear drive wheel, the vehicle being operable in a first driving mode, in which the front and rear drive wheels are selected to drive the vehicle, and a second driving mode, in which either but not both of the front or rear drive wheels is selected to drive the vehicle, the system comprising:
a first disconnect disposed between the prime mover and a certain one of the drive wheels, the first disconnect being operable to connect the prime mover to, and disconnect the prime mover from, the certain one of the drive wheels;
a second disconnect disposed between the powertrain and the certain one of the drive wheels, the second disconnect being operable to connect the certain one of the drive wheels to, and disconnect the certain one of the drive wheels from, the powertrain; and
a control system including at least one controller and configured to control operation of at least the first and second disconnects.

17. The system of claim 16, wherein the first disconnect is partially engagable to bias the torque from the prime mover between the first and second drive wheels.

18. The system of claim 16, wherein the control system is configured to engage the first disconnect before the second disconnect such that the certain one of the drive wheels achieves a generally synchronous speed with the powertrain prior to being connected to the powertrain.

19. The system of claim 16, further comprising an electric motor arrangement operable to provide torque to the certain one of the drive wheels, the control system being further configured to operate the motor before engaging the second disconnect such that the certain one of the drive wheels achieves a generally synchronous speed with the powertrain prior to being connected to the powertrain.

* * * * *